United States Patent [19]
Tobita et al.

[11] Patent Number: 5,363,352
[45] Date of Patent: Nov. 8, 1994

[54] MAGNETO-OPTIC DISK APPARATUS

[75] Inventors: Minoru Tobita, Tokyo; Tamotsu Yamagami, Kanagawa, both of Japan

[73] Assignee: Sony Corporation, Tokyo, Japan

[21] Appl. No.: 14,112

[22] Filed: Feb. 5, 1993

[30] Foreign Application Priority Data

Feb. 10, 1992 [JP] Japan .................................. 4-024036

[51] Int. Cl.$^5$ ............................................. G11B 11/00
[52] U.S. Cl. ............................................ 369/13; 369/47
[58] Field of Search ................... 369/13, 14, 47, 48, 369/59; 360/59, 114, 51, 40, 41

[56] References Cited

U.S. PATENT DOCUMENTS

| | | | |
|---|---|---|---|
| 4,970,609 | 11/1990 | Cunningham et al. | 360/51 |
| 5,121,369 | 6/1992 | Makansi | 369/13 |
| 5,235,590 | 8/1993 | Taguchi et al. | 369/13 |
| 5,237,554 | 8/1993 | Senshu et al. | 369/48 |

FOREIGN PATENT DOCUMENTS

3201265 9/1991 Japan ..................... 369/13

*Primary Examiner*—Robert J. Pascal
*Assistant Examiner*—Tan Dinh
*Attorney, Agent, or Firm*—Limbach & Limbach

[57] ABSTRACT

A magneto-optic disk apparatus is disclosed which can reproduce data well from a magneto-optic disk on which the data are reproduced in a high density with an increased line density. Recording data are converted into NRZI data by a pre-encoder and recorded onto a magneto-optic disk using a magnetic field modulating method while irradiating a laser beam intermittently upon the disk. A reproduced radio frequency signal from the disk is clamped for each segment by a clamp circuit, converted into a digital signal by an analog to digital converter, waveform equalized by an equalizer so that it may be approximated to the waveform of a cosine filter suitable for partial response PR(1, 1), and supplied to a data detection circuit. The data detection circuit detects data using the viterbi algorithm to obtain reproduced data in the form of NRZ data. Since the partial response PR(1, 1) in which inter symbol interference is used positively is applied, even if the line density is raised to achieve high density recording, a sufficient phase margin can be assured. Since viterbi decoding is applied, the S/N ratio is enhanced to reduce the code error rate.

6 Claims, 9 Drawing Sheets

F I G. 6A  REFERENCE DATA

F I G. 6B  REPRODUCED RF SIGNAL

MAGNETO-OPTIC DISK APPARATUS

BACKGROUND OF THE INVENTION

1. Field of the Invention

This invention relates to a magneto-optic disk apparatus.

2. Description of the Related Art

Increase of the capacity of magneto-optic disks has been and is proceeding similarly to hard disks. One possible means to realize such increased capacity is to decrease the track pitch or to raise the line density.

When, for example, the line density is raised to achieve high density recording, there is a problem that inter symbol interference occurs. When NRZ (non-return-to-zero) binary detection is applied to detection of data, the phase margin may be decreased which increases the data error rate.

SUMMARY OF THE INVENTION

It is an object of the present invention to provide a magneto-optic disk apparatus which can reproduce data well from a magneto-optic disk on which the data are reproduced at high density with an increased line density.

In order to attain the object described above, according to the present invention, there is provided a magneto-optic disk apparatus (for a magneto-optic disk on which data are recorded in accordance with a magnetic field modulating method) which comprises means for driving the magneto-optic disk to rotate using a sample servo system, means for reproducing the data from the magneto-optic disk to produce a reproduced signal, equalizing means for equalizing the waveform of the reproduced signal applying partial response, and data detecting means for detecting data from the reproduced signal from the equalizing means applying viterbi decoding.

With the magneto-optic disk apparatus, the sample servo method is used as the servo method for the magneto-optic disk and even though the disk is recorded in a high density with an increased line density, reproduction of clocks can be performed stably. Further, since the sample servo method facilitates time management on the disk, it is advantageous in that circuit design is facilitated for a system wherein data for a predetermined period of time are processed collectively such as in viterbi decoding.

Furthermore, since data are stored onto the magneto-optic disk using the magnetic field modulating method, the symmetry in waveform is assured, which is advantageous for partial response in which inter symbol interference is used positively.

Furthermore, since partial response in which inter symbol interference is used positively is applied upon reproduction of data, even if the line density is raised to achieve high density recording, data can be detected with a sufficient phase margin, and the reliability of reproduced data Dout can be enhanced. In this instance, since the viterbi algorithm is applied, the S/N ratio upon decoding for each bit is enhanced and the code error rate can be decreased.

Preferably, the magneto-optic disk is divided radially into a plurality of zones and the data are recorded such that the line densities of the zones may be substantially equal to one another. Thus, the line density can also be increased on an outer periphery portion of the magneto-optic disk, and accordingly, partial response can be better applied to detection of data. Furthermore, since the inter symbol interference is substantially uniform over the disk, the phase margin is stabilized and the equalizing coefficient of the equalizing means can be fixed so that the circuitry can be made smaller.

Preferably, a laser beam is intermittently irradiated to record the data onto the magneto-optic disk. Thus, heat accumulation does not occur and the pit diameter is not increased even if pits are formed successively. Accordingly, non-linear factors can be reduced, which is advantageous for partial response in which inter symbol interference is used positively.

The above and other objects, features and advantages of the present invention will become apparent from the following description and the appended claims, taken in conjunction with the accompanying drawings in which like parts or elements are denoted by like reference characters.

BRIEF DESCRIPTION OF TEE DRAWINGS

FIGS. 7A, 6B, and 6C are diagrams showing reference data used in the magneto-optic disk apparatus;

DETAILED DESCRIPTION OF THE PREFERRED EMBODIMENT

Figure 2:
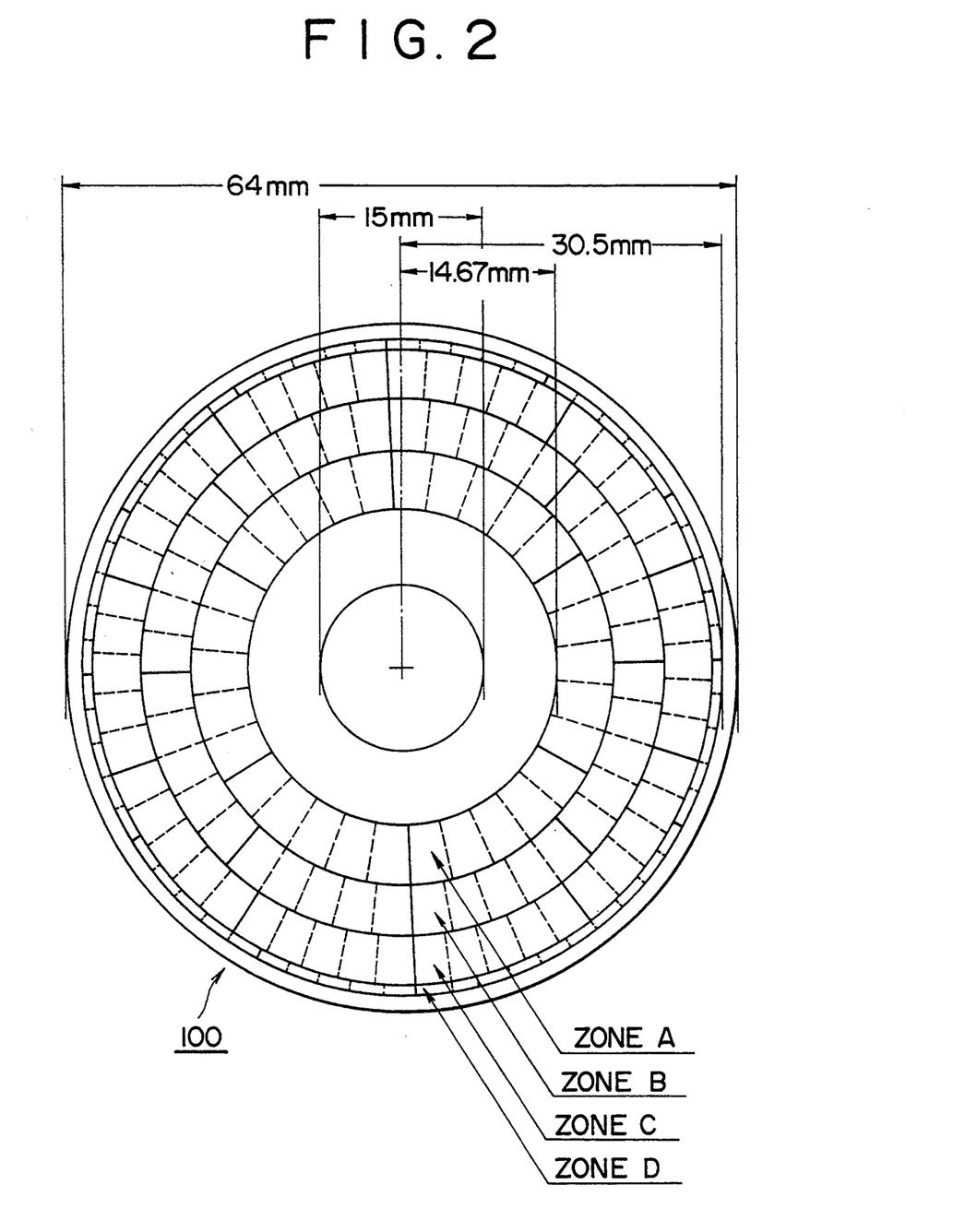
FIG. 2 is a schematic view showing general construction of a magneto-optic disk which is used in the magneto-optic disk apparatus of the present invention.

Referring first to FIG. 2, there is shown general construction of a magneto-optic disk for use with a magneto-optic disk apparatus of the present invention. The magneto-optic disk 100 has a diameter of 64 mm and has a data recording area which is divided radially into four zones A to D. The zone A is a range of the radius from 14.67 to 20.07 mm; the zone B is another range of the radius from 20.07 to 24.70 mm; the zone C is a further range of the radius from 24.70 to 29.34 mm; and the zone D is a still further range of the radius from 29.34 to 30.50 mm.

The number of tracks in each of the zones A to D is: 3,857 for the zone A; 3,307 for the zone B; 3,314 for the zone C; and 828 for the zone D. The number of sectors in each of the zones A to D is: 30 sectors/track for the zone A; 40 sectors/track for the zone B; 50 sectors/track for the zone C; and 60 sectors/track for the zone D. In FIG. 2, each of full lines and broken lines which extend radially indicates a boundary between adjacent sectors.

Each sector can be recorded with user data of 512 bytes, and the line density on the innermost circumference in each of the zones A to D is about 0.5 μm/bit.

User data are recorded in the following manner in the zones A to D, and the total amount of user data is about 238 megabytes.

Zone A: $3,857 \times 30 \times 512 \approx 59.24$ megabytes
Zone B: $3,307 \times 40 \times 512 \approx 67.73$ megabytes
Zone C: $3,314 \times 50 \times 512 \approx 84.84$ megabytes
Zone D: $828 \times 60 \times 512 \approx 25.44$ megabytes It is to be noted a sample servo method which is well known in the art is adopted as the servo method of the disk 100.

Figure 1:
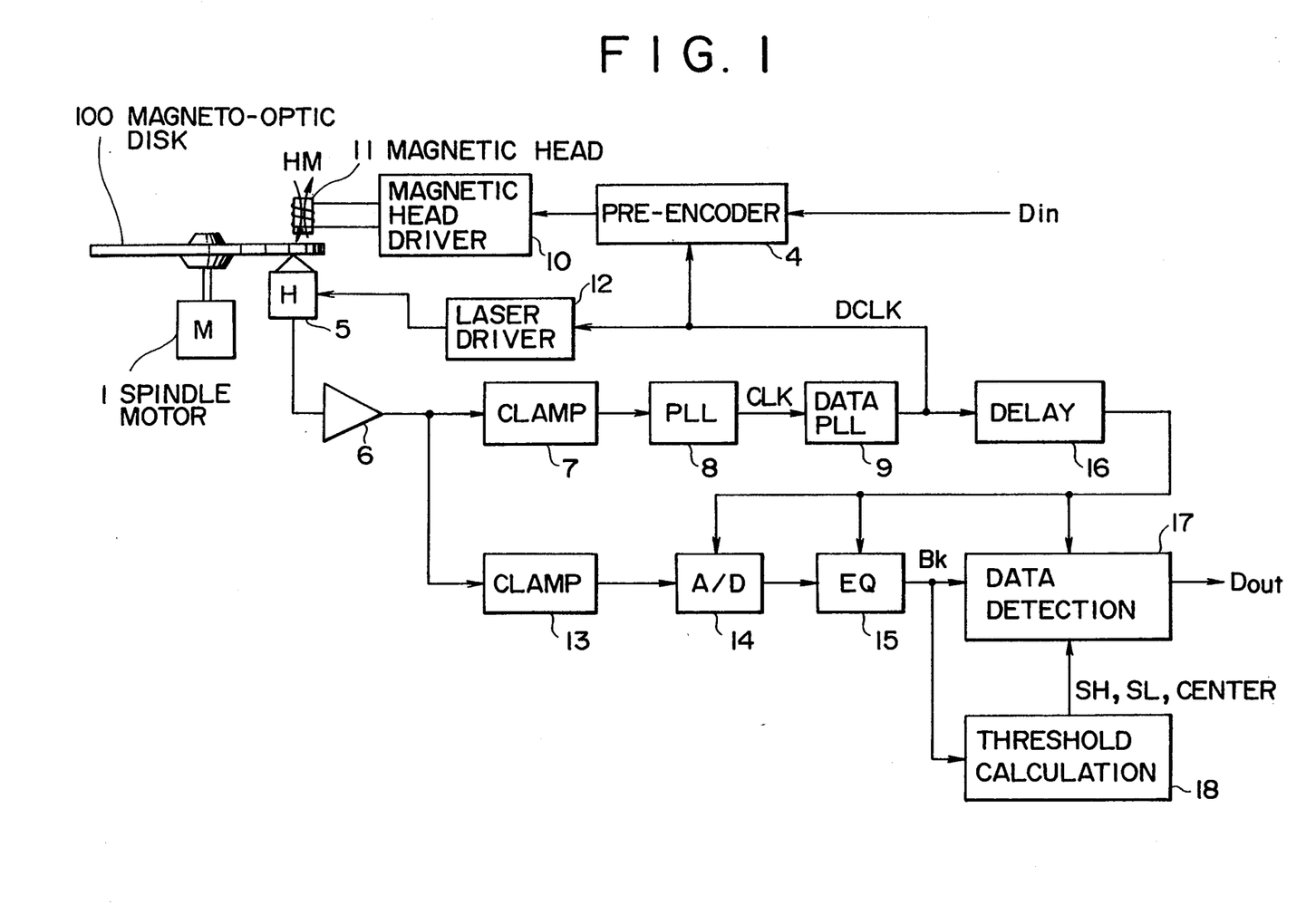
FIG. 1 is a block diagram of a magneto-optic disk apparatus showing a preferred embodiment of the present invention.

Referring now to FIG. 1, there is shown a magneto-optic disk apparatus to which the present invention is applied. First, a recording system of the magneto-optic disk apparatus will be described.

The magneto-optic disk apparatus includes a spindle motor 1 by which the disk 100 is driven to rotate at a fixed angular velocity.

Recording data (NRZ data) Din from a host computer not shown are supplied to a pre-encoder 4, by which they are coded into data of an NRZI sequence.

A signal reproduced by an optical head 5 from clock pits pre-formatted on a servo byte SB of the disk 100 is supplied to a PLL (phase locked loop) circuit 8 by way of a series circuit of a radio frequency (RF) amplifier 6 and a clamp circuit 7. A system clock signal CLK is outputted from the PLL circuit 8 in synchronism with the signal reproduced from the clock pits.

The system clock signal CLK outputted from the PLL circuit 8 is supplied to a data PLL circuit 9. The data PLL circuit 9 forms a data clock signal DCLK from the system clock signal CLK.

The recording data Din are supplied to the pre-encoder 4 described above in synchronism with the data clock signal DCLK outputted from the data PLL circuit 9 and are converted into data of an NRZI sequence by the pre-encoder 4.

The modulated signal outputted from the pre-encoder 4 is supplied to a magnetic head driver circuit 10. The magnetic head driver circuit 10 drives a magnetic head 11 for generation of an external magnetic field so that a magnetic field is generated from the magnetic head 11 in accordance with the received modulated signal. Simultaneously, a laser beam is generated from the optical head 5 and cooperates with the magnetic field to record the modulated signal as pits onto the disk 100.

Figure 3A:
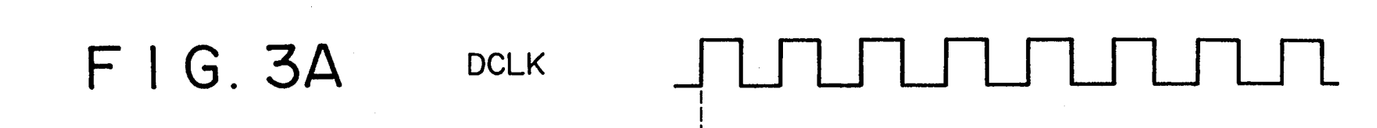
FIGS. 3A, 3B, 3C, 3D and 3E are waveform diagrams illustrating pulse recording operation of the magneto-optic disk recording apparatus.
Figure 3B:
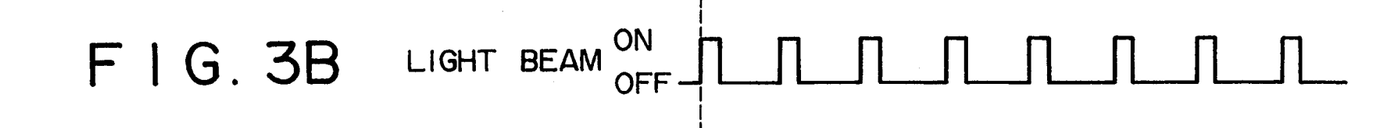
Figure 3C:
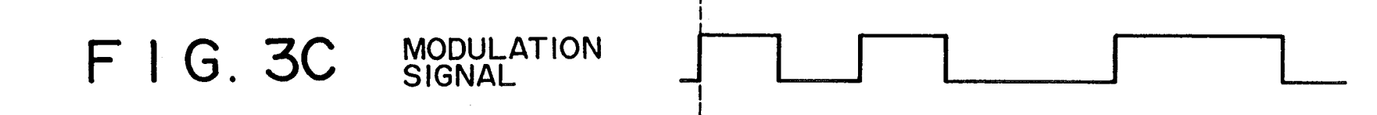
Figure 3D:
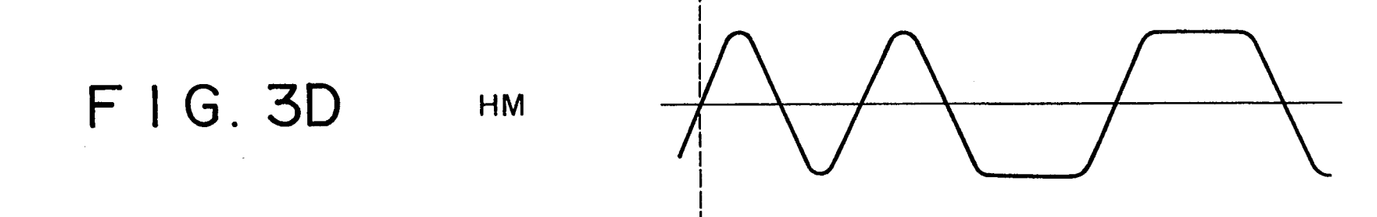
Figure 3E:
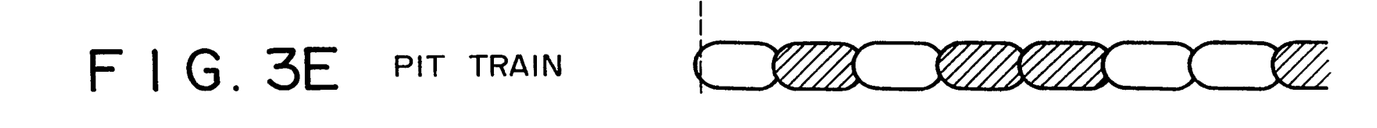

In this instance, the data clock signal DCLK outputted from the data PLL circuit 9 is supplied to a laser driver circuit 12. A laser beam is irradiated intermittently from the optical head 5 upon the disk 100 (refer to the waveform curve in FIG. 3B) in synchronism with the data clock signal DCLK (refer to the waveform curve in FIG. 3A). Here, the waveform curve in FIG. 3C shows the modulated signal outputted from the pre-encoder 4, and the waveform curve in FIG. 3D the modulating magnetic field HM formed by the magnetic head 11 while the waveform curve in FIG. 3E shows a train of pits formed on the disk 100.

By performing irradiation of a light beam intermittently in this manner, the temperature variation of a region around a location at which a pit is formed can be reduced comparing with an alternative case wherein a light beam is irradiated continuously, and otherwise possible displacement of the formed pit position which may be caused by the temperature variation can be thereby reduced.

It is to be noted that, at the servo byte SB (see FIG. 5) of the disk 100, irradiation of a light beam is performed continuously to obtain a better reproduced signal from clock pits or wobble pits.

A reproducing system of the magneto-optic disk apparatus will now be described. During reproduction, the disk 100 is controlled so that it is rotated at a fixed angular velocity. Further, during reproduction, irradiation of a light beam is always performed continuously.

A radio frequency (RF) signal reproduced from the disk 100 by the optical head 5 is supplied to a clamp circuit 13 by way of the radio frequency amplifier 6. The clamp circuit 13 performs clamping processing for all of segments of the reproduced radio frequency signal so that low frequency disturbance, which is caused by a variation of reflected light from the disk 100, is eliminated.

The reproduced radio frequency signal clamped by the clamp circuit 13 is supplied to an analog to digital (A/D) converter 14, by which it is converted into a digital signal, and the digital signal is supplied to a digital equalizer (EQ) 15. The data clock signal DCLK outputted from the data PLL circuit 9 described above is delayed by a predetermined interval of time by a delay circuit 16 and supplied to the analog to digital converter 14 and the equalizer 15. The delay time of the delay circuit 16 may be equal to a ½ data clock period, but may be adjusted suitably in accordance with a phase displacement of pits formed on the disk 100 or the like.

Figure 4A:
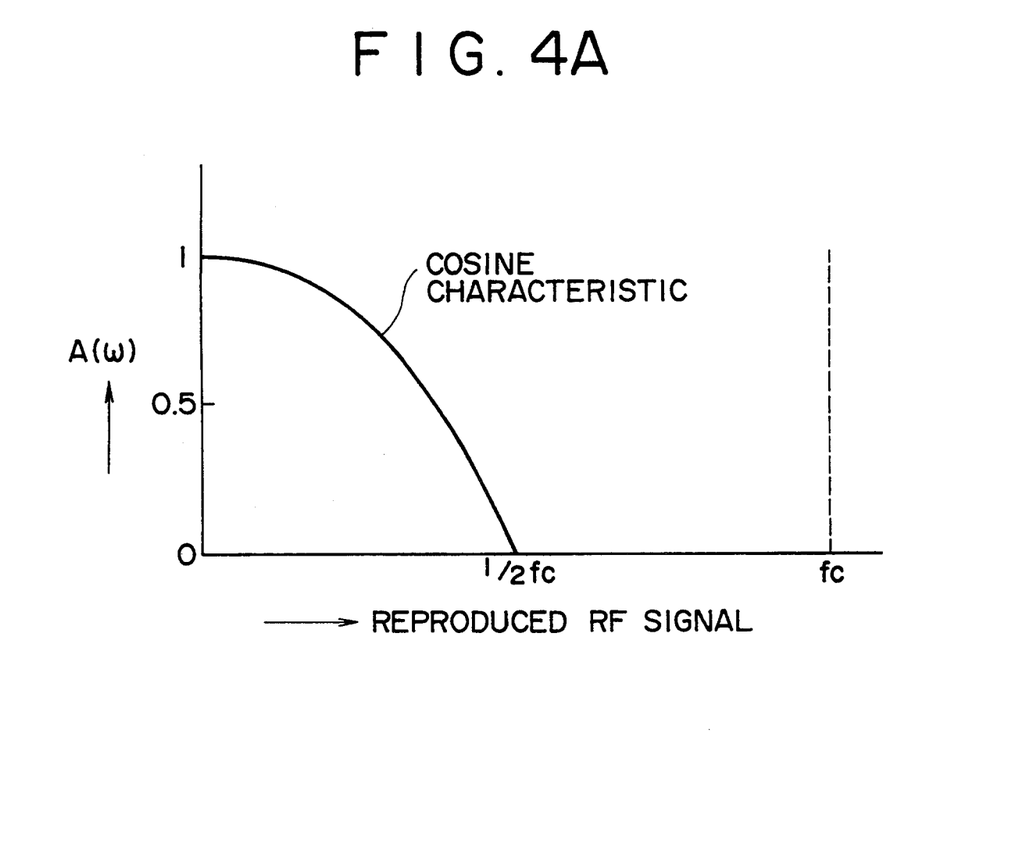
FIGS. 4A and 4B are diagrams illustrating a characteristic of a digital equalizer of the magneto-optic disk apparatus.
Figure 4B:
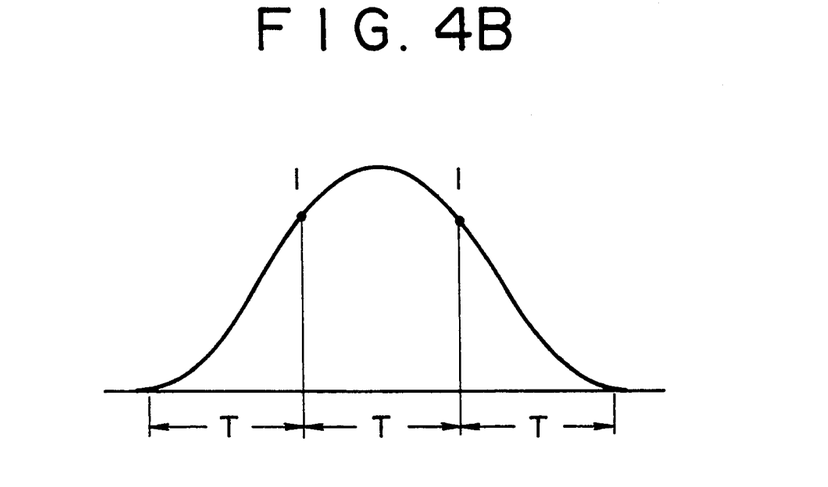

The pass frequency characteristic of the equalizer 15 is set to be a cosine characteristic as shown in FIG. 4A and the reproduced radio frequency signal may be approximated to a partial response (1, 1) as far as possible as shown in FIG. 4B.

The reproduced radio frequency signal outputted from the equalizer 15 is supplied to a data detection circuit 17 which performs detection of data of the partial response class 1-PR(1, 1) using the viterbi algorithm and also to a threshold calculation circuit 18 having a defect checking function. In the defect checking, it is judged whether or not the level of a pattern of sampled reference data (which will be hereinafter described is reasonable. The data clock signal DCLK outputted from the data PLL circuit 9 is supplied also to the data detection circuit 17.

Figure 5:
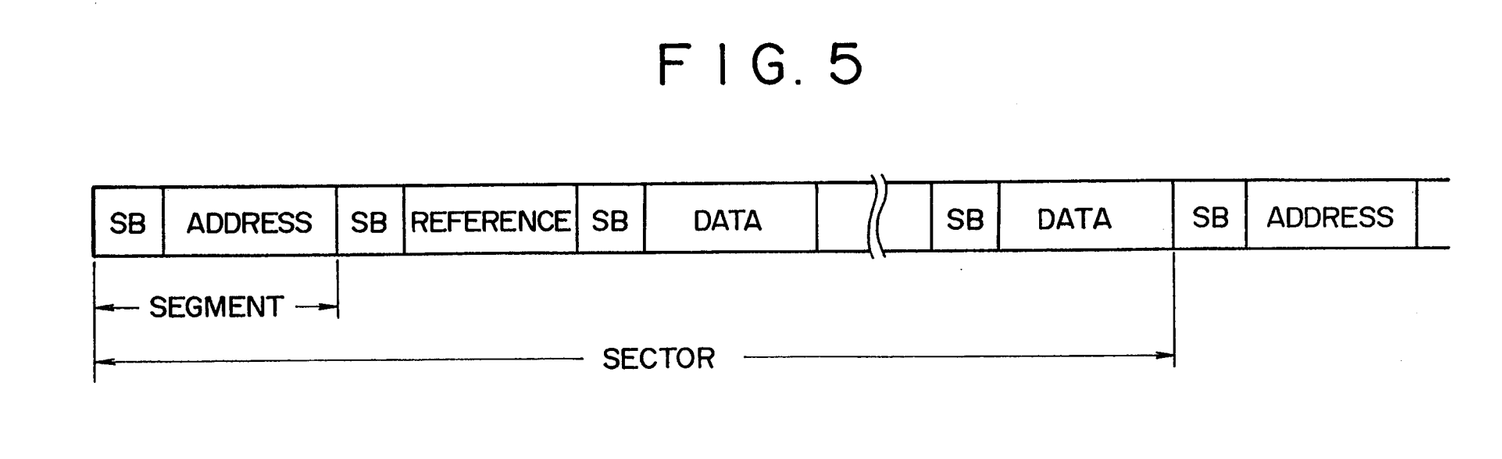
FIG. 5 is a diagrammatic view showing a sector format (data format) of the magneto-optic disk shown in FIG. 2.
Figure 6A:
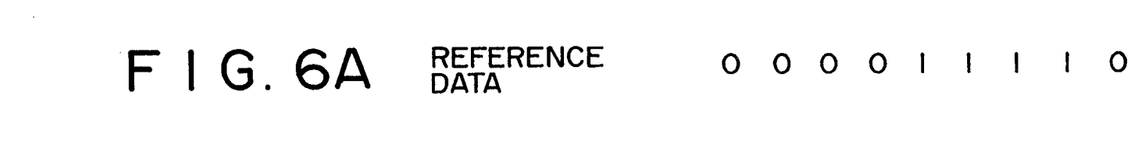
Figure 6B:
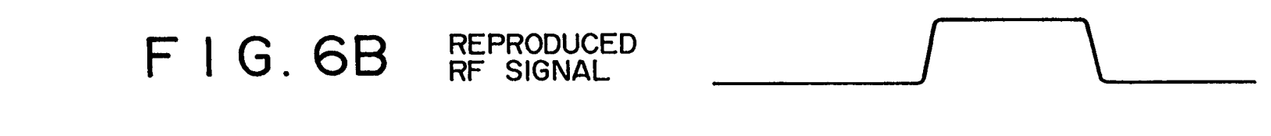
Figure 6C:
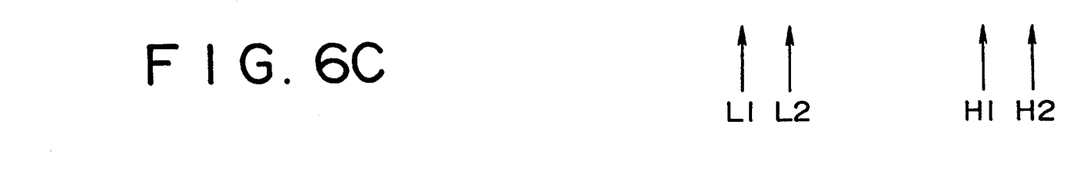
Figure 7:
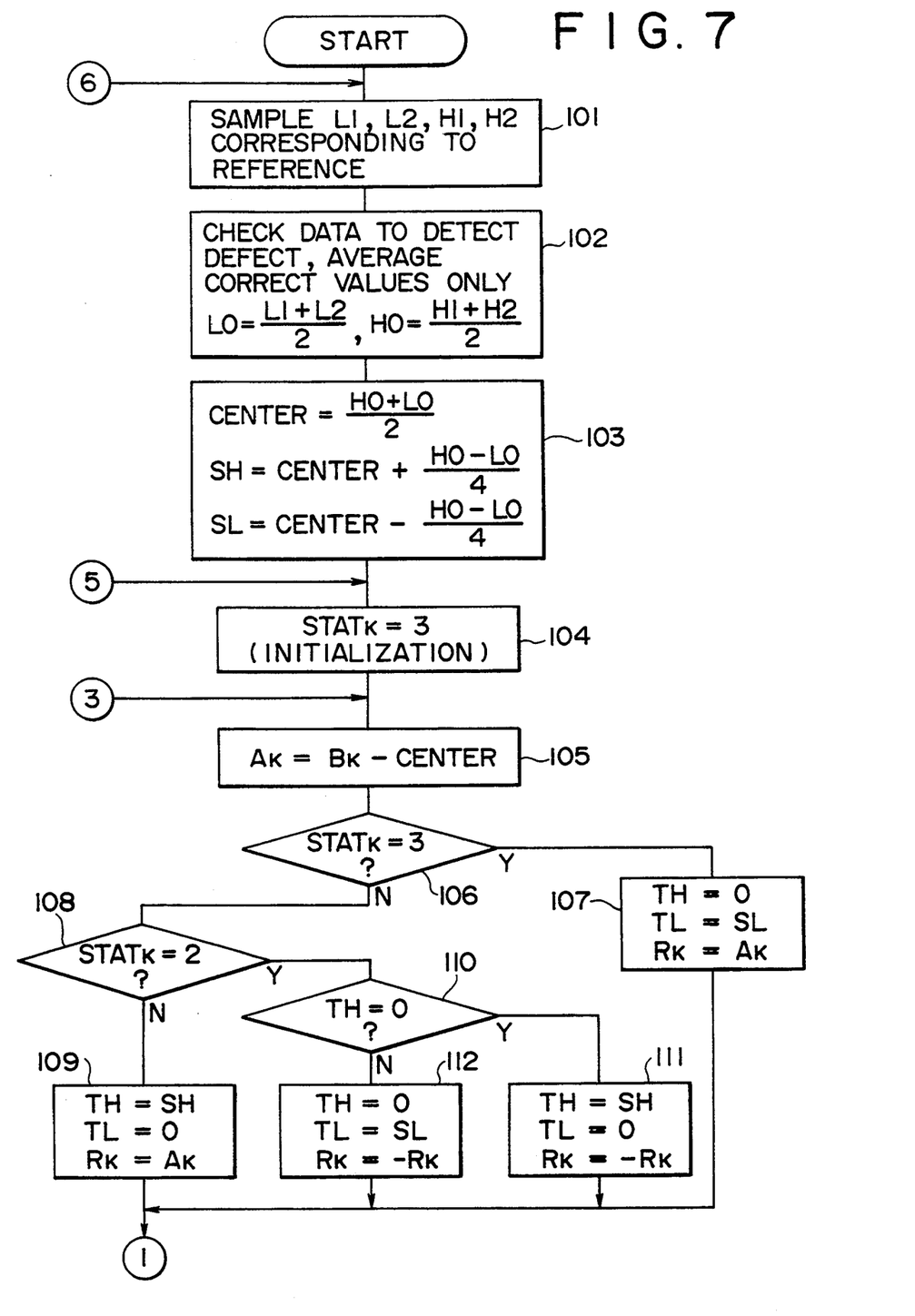
FIGS. 7 to 9 are flow charts illustrating operation a data detection circuit and a threshold calculation circuit of the magneto-optic disk apparatus.
Figure 8:
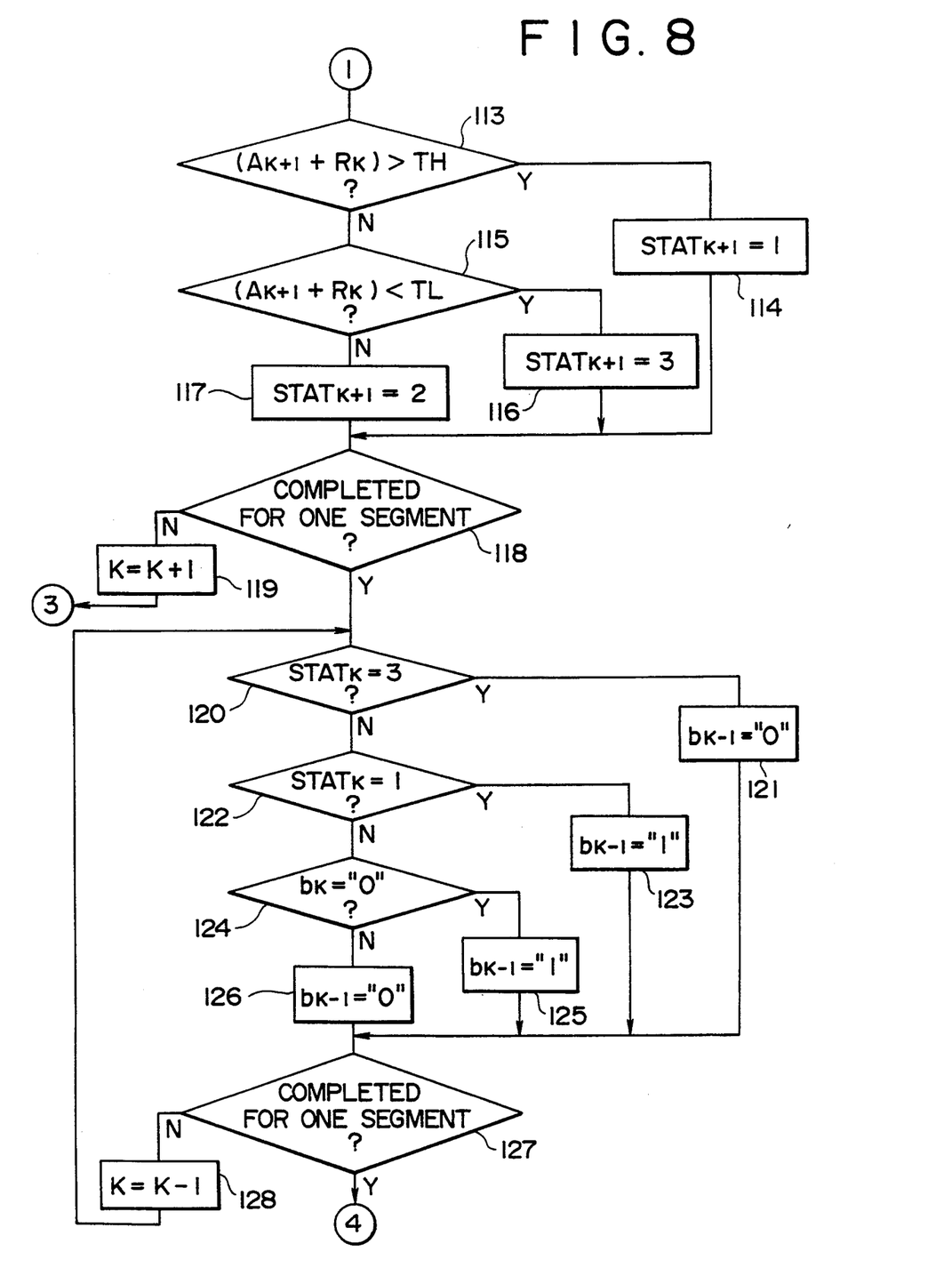
Figure 9:
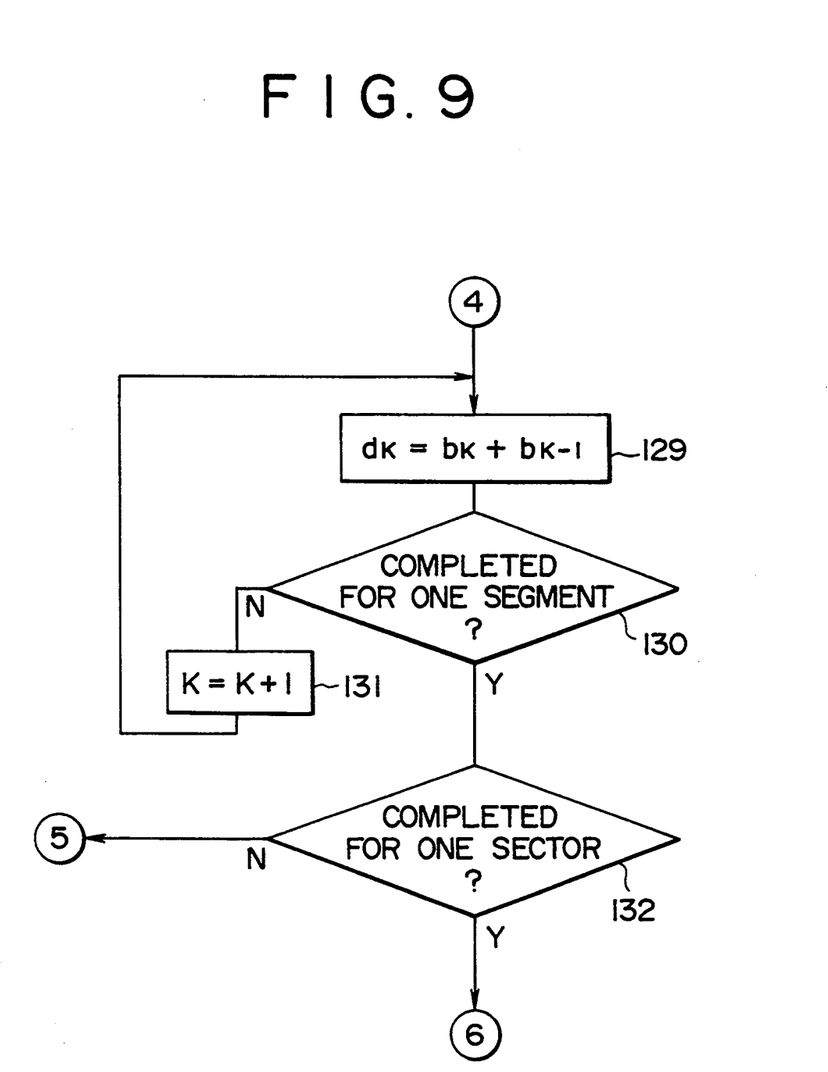

The flow charts of FIGS. 7 to 9 illustrate operation of the data detection circuit 17 and the threshold calculation circuit 18. Referring first to FIG. 6C and 7, signal samples L1, L2, H1 and H2 are sampled from a portion of a reproduced signal corresponding to the reference data (step 101). FIG. 5 illustrates a sector format (data format) of the disk 100. In the sector format shown of the disk 100, reference data of such a pattern as shown, for example, in FIG. 6A is disposed in the reference area, and signal samples L1, L2, H1 and H2 are taken from a reproduced radio frequency signal (waveform in FIG. 6B) corresponding to the reference data (sampling clocks therefor are shown by the diagram of FIG. 6C).

Then, the signal samples L1, L2, H1 and H2 are checked to for defects, and only correct signals are added and averaged to form signals L0 and H0 (step 102). For example, when all of the signal samples L1, L2, H1 and H2 are correct, the calculation proceeds in accordance with the following equations:

$$L0 = (L1 + L2)/2$$

$$H0 = (H1 + L2)/2$$

Subsequently, using the signals L0 and H0, the levels of parameters SL, SH and CENTER are calculated in accordance with the following equations (step 103):

$$CENTER = (H0 + L0)/2$$

$$SH = CENTER + (H0 - L0)/4$$

$$SL = CENTER - (H0 - L0)/4$$

The steps 101 to 103 described above are performed by the threshold calculation circuit 18. The following steps 104–132 are performed by the data detection circuit 17.

First, the state STATk is initialized to STATk=3 (step 104), and then a parameter Ak is set to Ak=Bk−CENTER (step 105).

Then, it is judged whether or not STATk=3 (step 106). When STATk=3 stands, threshold levels TH and TL and a parameter Rk are set to TH=0, TL=SL and Rk=Ak (step 107).

On the other hand, when the state STATk is not equal to 3, it is judged whether or not STATk=2 (step 108). When STATk=2 does not stand, the threshold levels TH and TL and the parameter Rk are set to TH=SH, TL=0 and Rk=Ak, respectively (step 109).

When the state STATk is equal to 2 at step 108, it is judged whether or not TH=0 (step 110). When TH=0 stands, the threshold levels TH and TL and the parameter Rk are set to TH=SH, TL=0 and Rk=−Rk, respectively (step 111). On the other hand, when TH=0 does not stand at step 110, the threshold levels TH and TL and the parameter Rk are set to TH=0, TL=SL and Rk=−Rk, respectively (step 112).

Values of the threshold levels TH and TL and the parameter Rk with which a state at a point of time k+1 is to be determined based on the state STATk at the point of time k are determined at steps 105 to 112 described above.

Subsequently, referring now to FIG. 8, it is judged whether or not (Ak+1+Rk)>TH stands (step 113). When (Ak+1+Rk)>TH stands, the state STATk+1 is set to STATk+1=1 (step 114).

On the other hand, when (Ak+1+Rk)>TH does not stand at step 113, it is judged whether or not (Ak+1 Rk)<TL stands (step 115). When (Ak+1+Rk)<TL stands, the state STATk+1 is set to STATk+1=3 (step 116), but when (Ak+1+Rk)<TL does not stand, the state STATk+1 is set to STATk+1=2 (step 117).

The state STATk+1 at the point of time k+1 is determined using the values of the threshold levels TH and TL and the parameter Rk at steps 113 to 117 described above.

Subsequently, it is judged whether or not the processing for determination of a state for one segment described above has been completed(step 118). When the processing has not been completed yet, the parameter k is incremented to k=k+1 (step 119), and then the control sequence returns to step 105 so that similar processing to that described above is thereafter repeated.

It is to be noted that data of a state at every point of time are stored into a RAM (random access memory) or the like so that they may be used for processing of conversion thereof into NRZI data as hereinafter described.

When it is judged at step 118 that the processing has been completed, decoding processing of the data into NRZI data is performed at the following steps.

First, it is judged whether or not STATk=3 stands (step 120). When STATk=3 stands, bit data bk-1 at the point of time k-1 is set to bk-1="0" (step 121).

When STATk=3 does not stand at step 120, it is judged whether or not STATk=1 stands (step 122). When STATk=1 stands, the bit data bk-1 is set to bk-1="1" (step 123).

When STATk=1 does not stand at step 122, it is judged whether or not bit data bk at the point of time k is bk="0" (step 124). When bk="0" stands, the bit data bk-1 is set to bk-1="1" (step 125). On the other hand, when bk="0" does not stand, the bit data bk-1 is set to bk-1="0" (step 126).

The bit data bk-1 at the point of time k-1 is converted into NRZ data at steps 120 to 126 described above.

Then, it is judged whether or not the conversion processing for one segment has been completed (step 127). When the conversion processing has not been completed, the parameter k is set to k=k-1 (step 128), whereafter the control processing returns to step 120 so that similar processing to that described above is repeated.

It is to be noted that bit data at every point of time are stored into the RAM or the like so that they are later used for processing of conversion of them into NRZ data as hereinafter described.

When it is judged at step 127 that the conversion processing has been completed, decoding processing of the data into NRZI data is performed at the following steps.

In particular, referring now to FIG. 9, bit data dk at the point of time k is calculated in accordance with the equation dk=bk+bk-1 (step 129). The addition in this instance is addition of mod2.

Then, it is judged whether or not the conversion processing for one segment has been completed (step 130). When the conversion processing has not been completed yet, the parameter k is set to k=k+1 (step 131), whereafter the control sequence returns to step 129 so that similar processing is thereafter performed repetitively.

When it is judged at step 130 that the conversion processing has been completed, it is judged whether or not the processing for one sector has been completed (step 132). When the processing has not been completed, the control sequence returns to step 104 so that similar processing to that described above is performed for a next segment. On the other hand, when the processing has been completed at step 132, the control sequence returns to step 101 so that similar processing to that described above is performed for a next sector.

Figure 10:
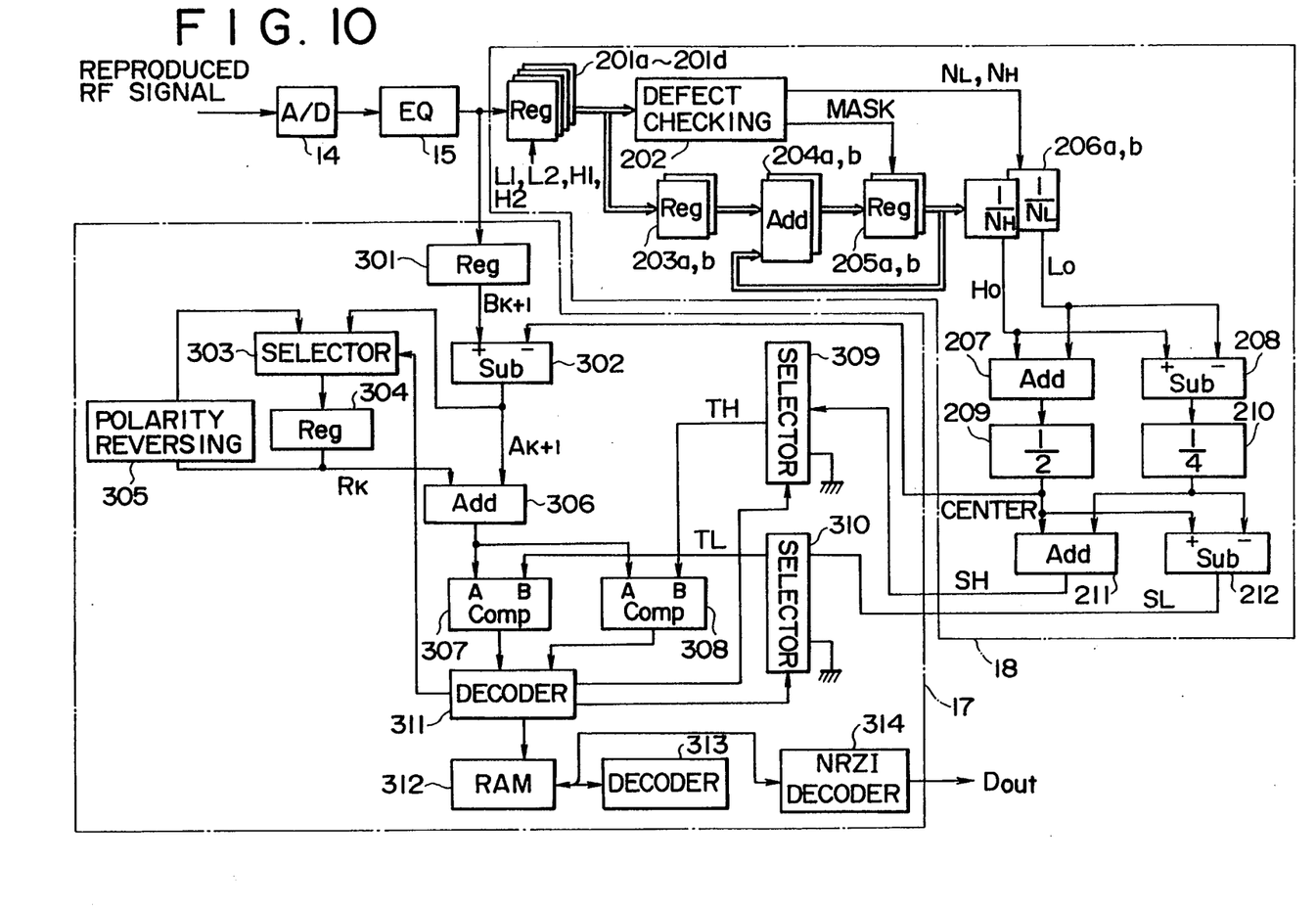
FIG. 10 is a block diagram of detailed construction of the data detection circuit and the threshold calculation circuit of the magneto-optic disk apparatus.

Details of the data detection circuit 17 and the threshold calculation circuit 18 which operate in accordance with the flow charts of FIGS. 7 to 9 are shown in FIG. 10.

Referring to FIG. 10, a reproduced radio frequency (RF) signal outputted from the equalizer 15 is supplied to registers (Reg) 201a to 201d of the threshold calculation circuit 18. Signals L1, L2, H1 and H2 are sampled from the reproduced radio frequency signal corresponding to the reference data by and stored into the registers 201a to 201d, respectively.

The signals stored in the registers 201a to 201d are supplied to a defect checking circuit 202, by which it is judged based on a pattern or an amplitude value thereof whether or not they are correct.

Meanwhile, the signals stored in the registers 201a to 201d are accumulated by a pair of registers (Reg) 203a and 203b, a pair of adders (Add) 204a and 204b and another pair of registers (Reg) 205a and 205b. In this instance, while accumulation of the signals L1 and L2 and of the signals H1 and H2 is performed basically, a masking signal MASK is supplied from the checking circuit 202 to the registers 205a and 205b so that accumulation of an incorrect signal is prevented. The accumulation signals outputted from the registers 205a and 205b are supplied to a pair of dividers (1/NH, 1/NL) 206a and 206b, respectively, in which they are divided to 1/NL and 1/NH to form signals L0 and H0, respectively. The values NL and NH are values which the signals have been judged to be correct by the checking circuit 202.

The signals L0 and H0 formed by the dividers 206a and 206b are supplied to an adder (Add) 207 and a subtractor (Sub) 208. The output signal of the adder 207 is supplied to another adder (Add) 211 and another subtractor (Sub) 212 by way of a ½ coefficient circuit (½) 209. Meanwhile, the output signal of the subtractor 208 is supplied to a further adder (Add) 211 and a further subtractor (Sub) 212 by way of a ¼ coefficient circuit (¼) 210. A signal CENTER is obtained from the coefficient circuit 209; another signal SH is obtained from the adder 211; and a further signal SL is obtained from the subtractor 212.

Further, the reproduced radio frequency signal outputted from the equalizer 15 is supplied to a subtractor (Sub) 302 by way of a register (Reg) 301 which is a component of the data detection circuit 17. The signal CENTER is supplied from the coefficient circuit 209 to the subtractor 302. The subtractor 302 executes the operation at step 105 described hereinabove with reference to FIG. 7.

The output signal of the subtractor 302 is supplied as one input of a pair of inputs of a selector 303. The output signal of the selector 303 is supplied to the other input of the selector 303 by way of a register (Reg) 304 and a polarity reversing circuit 305.

The output signal of the subtractor 302 is further supplied to an adder (Add) 306 together with the output signal of the register 304. The signal Ak+1+Rk which is used at steps 113 and 115 described above (refer to FIG. 8) is obtained from the adder 306. The output signal of the adder 306 is supplied to input terminals A of a pair of comparators (Comp) 307 and 308.

Meanwhile, the signal SH obtained from the adder 211 is supplied to one of a pair of inputs of a selector 309, and the other input of the selector 309 is grounded (to the zero potential). The output signal of the selector 309 is supplied as the threshold level TH to the other input terminal B of the comparator 308.

In the meantime, the signal SL obtained from the subtractor 212 is supplied to one of a pair of inputs of a selector 310, and the other input of the selector 310 is grounded (to the zero potential). The output signal of the selector 310 is supplied as the threshold level TL to the other input terminal B of the comparator 307.

Results of comparison at the comparators 307 and 308 are supplied to a decoder 311. The decoder 311 performs processing of determining a state STATk+1 at the point of time k+1 based on the result of comparison. In short, the operations at steps 113 to 117 described above (refer to FIG. 8) are performed by the decoder 311.

Further, a select signal is supplied from the decoder 311 to the selectors 303, 309 and 310 in accordance with a state STATk at the point of time k. Consequently, the processing of determining the threshold levels TH and TL and so forth at steps 106 to 112 described above (refer to FIG. 7) is performed by the selectors 303, 309 and 310.

State data at every point of time determined by the decoder 311 are supplied to and stored into a RAM 312 for each one segment.

The state data for one segment stored in the RAM 312 are successively supplied to a decoder 313, by which they are converted into NRZI data. The operations at steps 120 to 126 (refer to FIG. 8) are performed by the decoder 313. The NRZI data obtained from the decoder 313 are stored back into the RAM 312.

The NRZI data for one segment stored in the RAM 312 are successively supplied to an NRZI decoder 314, by which they are converted back into NRZ data. The operation at step 129 (refer to FIG. 9) is performed by the decoder 314.

Referring back to FIG. 1, NRZ data outputted from the data detection circuit 17 are supplied as reproduced data Dout to the host computer.

In the magneto-optic disk apparatus of the embodiment described above, since the sample servo method is used as the servo,method, even if the disk 100 is recorded in a high density with an increased line density, reproduction of clocks can be performed stably.

Further, since the sample servo method facilitates time management on a disk, it is advantageous in that circuit design is facilitated for a system wherein data for one segment are processed collectively as described above.

Furthermore, since data are stored onto the disk 100 using the magnetic field modulating method, the symmetry in waveform is assured, which is advantageous for partial response in which inter symbol interference is used positively.

Further, since a laser beam is intermittently irradiated from the optical head 5 to record the disk 100, heat accumulation does not occur and the pit diameter is not increased even if pits are formed successively, and accordingly, non-linear factors can be reduced, which is advantageous for partial response in which inter symbol interference is used positively.

Further, the recording area of the disk 100 is divided radially into the four zones A to D, and the line density on the innermost periphery of each zone is about 0.5 μm/pit while the line density on the outermost periphery side of the disk 100 can be increased. Accordingly, partial response can be better applied to detection of data. Furthermore, since the inter symbol interference is substantially uniform over the disk 100, there are advantages in that the phase margin is stabilized, that the equalizing coefficient of the equalizer 15 can be fixed so that the circuitry can be made smaller.

Furthermore, since partial response in which inter symbol interference is used positively is applied upon reproduction of data, even if the line density is raised to achieve high density recording, data can be detected with a sufficient phase margin, and the reliability of reproduced data Dout can be enhanced. In this instance, since the viterbi algorithm is employed, the S/N ratio upon decoding for each bit is enhanced and the code error rate can be decreased.

It is to be noted that, while, in the embodiment described above, the recording data Din (NRZ data) are converted into data of an NRZI sequence by the pre-encoder 4 and then recorded onto the disk 100, alternatively when the recording data Din are recorded while they remain as NRZ data, the operations at steps 129 to 131 are unnecessary since NRZ data are obtained by viterbi decoding.

Further, while, in the embodiment described above, the equalizer 15 is disposed at the stage next to the analog to digital converter 14 and performs digital equalization of the waveform, it may otherwise be disposed at the stage preceding to the analog to digital converter 14 so as to effect waveform equalization in an analog fashion. However, in a system wherein the time per tap is varied by such techniques as zoning as in the embodiment described above, it is advantageous to perform waveform equalization digitally.

Further, the diameter, the number of zones, the number of sectors and so forth of the disk in the embodiment described above are given only by way of an illustrative example, and naturally, the present invention is not limited to the specific construction.

It will be apparent to one of ordinary skill in the art that many changes and modifications can be made thereto without departing from the spirit and scope of the invention as set forth herein.

What is claimed is:

1. A magneto-optic disk apparatus for a magneto-optic disk on which data are recorded in accordance with a magnetic field modulating method, the magneto-optic disk apparatus comprising:
    means for driving the magneto-optic disk to rotate using a sample servo system;
    means for reproducing the data from the magneto-optic disk to produce a reproduced signal;
    equalizing means for equalizing the waveform of the reproduced signal applying partial response; and
    data detecting means for detecting data from the reproduced signal from the equalizing means applying viterbi decoding.

2. A magneto-optic disk apparatus according to claim 1, wherein the magneto-optic disk is divided radially into a plurality of zones and the data are recorded such that the line densities of the zones are substantially equal to one another.

3. A magneto-optic disk apparatus according to claim 1, further comprising means for intermittently irradiating a laser beam on the magneto-optic disk to record the data onto the magneto-optic disk.

4. A magneto-optic disk apparatus according to claim 1, further comprising threshold calculating means for determining a pair of higher and lower threshold levels and a center level from the reproduced signal from the equalizing means, the detecting means detecting data from the reproduced signal from the equalizing means using the threshold levels and the center level from the threshold calculating means.

5. A magneto-optic disk apparatus according to claim 4, wherein the threshold calculating means includes means for checking the reproduced signal from the equalizing means to detect a defect of the reproduced signal.

6. A magneto-optic disk apparatus for a magneto-optic disk on which NRZI data are recorded in accordance with a magnetic field modulating method, the magneto-optic disk apparatus comprising:
    a magneto-optic disk divided radially into a plurality of zones and the NRZI data are recorded such that the line densities of the zones are substantially equal to one another;
    means for driving the magneto-optic disk to rotate using a sample servo system;
    means for reproducing a radio frequency (RF) signal from the magneto-optic disk;
    clamping means for clamping all segments of the RF signal so that low frequency disturbances are eliminated and producing a clamped output signal;
    analog to digital converting means for converting the clamped output signal to a digital signal;
    equalizing means supplied with the digital signal and having a cosine pass frequency characteristic for equalizing the waveform of the digital signal applying partial response and outputting an equalized output signal;
    data detecting means for detecting data from the equalized output signal by applying viterbi decoding;
    threshold calculating means for determining a pair of higher and lower threshold levels and a center level from the equalized output signal, the detecting means detecting data from the equalized output signal using the threshold levels and the center level from the threshold calculating means, and wherein the threshold calculating means includes means for checking the equalized output signal to detect a defect; and
    data clock generating means for supplying a data clock derived from clock pits pre-formatted on servo bytes of the magneto-optic disk to the analog to digital converting means, the equalizing means and the data detecting means.

* * * * *